United States Patent
Maschmeyer et al.

(10) Patent No.: US 12,481,417 B2
(45) Date of Patent: Nov. 25, 2025

(54) COMPOSABLE LOW-RANK ADAPTATION MODELS FOR DEFINING LARGE-LANGUAGE MODEL TEXT STYLE

(71) Applicant: Shopify Inc., Ottawa (CA)

(72) Inventors: Russ Maschmeyer, Berkeley, CA (US); Eric Andrew Florenzano, San Francisco, CA (US); Brennan Letkeman, Calgary (CA); Diego Macario Bello, Montreal (CA)

(73) Assignee: Shopify Inc., Ottawa (CA)

( * ) Notice: Subject to any disclaimer, the term of this patent is extended or adjusted under 35 U.S.C. 154(b) by 188 days.

(21) Appl. No.: 18/468,460

(22) Filed: Sep. 15, 2023

(65) Prior Publication Data

US 2025/0094025 A1   Mar. 20, 2025

(51) Int. Cl.
 G06F 3/048 (2013.01)
 G06F 3/0484 (2022.01)
 G06F 40/56 (2020.01)
 H04L 51/02 (2022.01)

(52) U.S. Cl.
 CPC ........... G06F 3/0484 (2013.01); G06F 40/56 (2020.01); H04L 51/02 (2013.01)

(58) Field of Classification Search
 CPC .................................................. G06F 3/0484
 See application file for complete search history.

(56) References Cited

U.S. PATENT DOCUMENTS 10,235,362 B1 * 3/2019 Boynes ............... G06F 40/51
12,182,511 B2 12/2024 Dimitriadis et al.
2022/0383126 A1 12/2022 Chen et al.
2024/0355104 A1 * 10/2024 Alfassy ............ G06V 30/19173
2024/0419919 A1 * 12/2024 Xiang ...................... G06F 40/56
2025/0078074 A1 * 3/2025 Humpherys ........... G06N 20/00
(Continued)

FOREIGN PATENT DOCUMENTS

WO   2025102041 A1   5/2025

OTHER PUBLICATIONS

Hu et al., Lora: Low-Rank Adaptation of Large Language Models, 2021, Arxiv.gov, 26 pages (Year: 2021).*

(Continued)

*Primary Examiner* — Linh K Pham
(74) *Attorney, Agent, or Firm* — Moffat & Co

(57) ABSTRACT

A computer system maintains low-rank adaptation (LoRA) models, where each LoRA model includes a set of weights configured to modify parameters of a large-language model (LLM) to cause the LLM to generate text having a corresponding property. The computer system presents a set of manipulable user-interface controls that allow configuration of properties of LLM-generated text. Output of the LLM is modified using LoRA models that are selected based on a state of the user-interface controls as manipulated. A preview is provided of LLM output corresponding to the current state of the user-interface controls during presentation and manipulation thereof. To provide this preview, the computer system iteratively provides a prompt to the LLM and outputs the output of the LLM responsive to that prompt for each iteration. For each iteration, the LLM output is modified using the LoRA models selected based on the current state of the user-interface controls as manipulated.

20 Claims, 9 Drawing Sheets

(56) References Cited

U.S. PATENT DOCUMENTS

2025/0078343 A1\* 3/2025 Chen ................ G06F 40/109
2025/0086187 A1\* 3/2025 Fayyaz ............... G06N 3/045

OTHER PUBLICATIONS

Ling et al., Domain Specialization as the Key to Make Large Language Models Disruptive: A Comprehensive Survey, 2024, Arxiv.gov, 35 pages.\*
Wang et al., VisionLLM: Large Language Model is also an Open-Ended Decoder for Vision-Centric Tasks, 2023, Arxiv.gov, 22 pages. (Year: 2023).\*
International Search Report and Written Opinion for PCT/CA2024/050370, filed Mar. 26, 2024, Report dated Jun. 4, 2024, 11 pages.
Wang et al., "Multitask prompt tuning enables parameter-efficient transfer learning", Eleventh International Conference on Learning Representations (ICLR 2023), pre-print retrieved from arXiv (arXiv:2303.02861v1), date: Mar. 2023, 16 pages.
Xu et al., "Parameter-Efficient Fine-Tuning Methods for Pretrained Language Models: A Critical Review and Assessment", preprint retrieved from arXiv (arXiv:2312.12148v1), date: Dec. 2023, 20 pages.
Sun et al., "Principle-Driven Self-Alignment of Language Models from Scratch with Minimal Human Supervision", preprint retrieved from arXiv (arXiv:2305.03047v1), date: May 2023, 52 pages.

\* cited by examiner

COMPOSABLE LOW-RANK ADAPTATION MODELS FOR DEFINING LARGE-LANGUAGE MODEL TEXT STYLE

TECHNICAL FIELD

This disclosure relates to large-language models (LLMs), and in particular to modifying LLMs using low-rank adaptation (LoRA) models.

BACKGROUND

Large-language models (LLMs) are useful for a wide variety of text generation applications, including, for example, generating text for output by chat agents. However, LLMs typically have millions or billions of parameters. Given the size of LLMs, it is infeasible for most applications to retrain an LLM to generate text that has specific properties.

BRIEF DESCRIPTION OF THE DRAWINGS

Detailed descriptions of implementations of the present invention will be described and explained through the use of the accompanying drawings.

Figure 1:
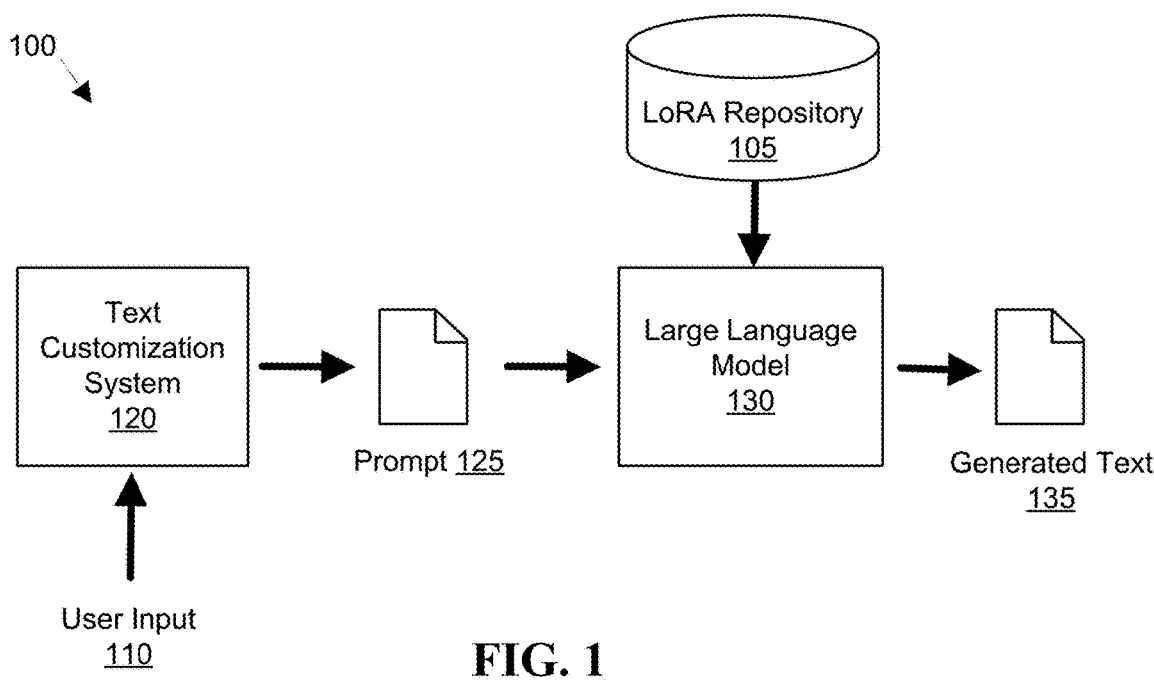
FIG. 1 is a block diagram illustrating an environment in which a text customization system operates, according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A computer system uses low-rank adaptation models (LoRAs) to customize large-language model (LLM) text generation, such as for LLM-based chat agents. LoRAs are models with a significantly lower rank than an LLM (e.g., having hundreds of parameters instead of hundreds of billions of parameters) but that when applied to an LLM modify parameters of the LLM. Given their smaller rank, it can be faster to train LoRAs than to fine-tune an LLM, and the LoRAs typically have a smaller size than the fine-tuned model. In at least some cases, LoRAs can perform better than fine-tuned LLMs when generating text with desired properties. Accordingly, the use of LORAs to modify an LLM can enable flexible customization of the LLM for a desired purpose.

According to implementations described herein, a computer system presents a set of manipulable user-interface controls that allow configuration of properties of text generated by an LLM. Output of the LLM is modified based on one or more LoRA models that are selected based on a state of the user-interface controls as manipulated. The computer system provides a preview of LLM output corresponding to the current state of the user-interface controls during presentation and manipulation thereof. To provide this preview, the computer system iteratively provides a prompt to the LLM and outputs the output of the LLM responsive to that prompt for each iteration. For each iteration, the output of the LLM is modified based on one or more of the LoRA models of the plurality of LORA models selected based on the current state of the user-interface controls as manipulated.

Text Customization System

FIG. 1 is a block diagram illustrating an environment 100 in which a text customization system 120 operates, according to some implementations. As shown in FIG. 1, the environment 100 can include a LoRA repository 105, the text customization system 120, and one or more large language models (LLMs) 130. Other implementations of the environment 100 include additional, fewer, or different components.

The LoRA repository 105 maintains low-rank adaptation (LoRA) models that are usable to modify text properties generated by an LLM. In particular, each LoRA model includes a set of weights that are configured to modify parameters of the LLM to cause the LLM to generate text having a specified property. For example, the repository 105 can include LoRA models that are trained to cause the LLM to generate text that uses certain regional dialects, has certain traits, or increases or decreases the degree of a trait, where such traits include, for example, friendliness, talkativeness, supportiveness, directness, concision or wordiness, gregariousness, reservation, or complementariness.

LoRAs are generally composable, meaning that multiple LoRAs can be applied to an LLM at the same time to change multiple properties of the LLM-generated text. However, composing multiple LoRAs does not necessarily cause linear effects on the output of an LLM. For example, some LoRAs when composed with certain other LoRAs overwhelm or cancel out the other LoRAs such that the other LoRAs do not have an effect on the text generated by the LLM (or have a lesser effect than if the other LoRAs were applied to the LLM alone). Similarly, the order in which LoRAs are composed can influence whether the LoRAs modify the LLM's parameters in the intended manner. For example, the text generated by an LLM when a first LoRA is applied first and a second LoRA is applied second may have different properties than the text generated when the second LoRA is applied first and the first LoRA applied second.

The text customization system 120 facilitates customization of LLM-generated text using LoRA models. A plurality of LORA models can be trained based on different text properties, such that each of the trained LoRA models when applied to an LLM will cause the LLM to produce text with a certain property. The text customization system 120 enables a user to select between the properties associated with the trained LoRA models in order to customize LLM-generated text to the user's preferences or needs.

In an example application of customizing LLM-generated text, the text customization system 120 enables a user to customize a chat agent for a particular purpose by selecting properties for the text to be output by the chat agent. A business who uses a chat agent on their website to interact with website visitors, for example, can specify properties of the text generated for output by the chat agent, thereby giving the chat agent a certain "personality" or set of traits. After an operator of the business selects desired properties for the chat agent's text, the corresponding LoRAs can be stored in a repository or instruction set used by the chat agent while it executes a conversation. In another example, a website visitor can customize the chat agent on the website to the visitor's preferences. After the visitor makes selections of the properties the visitor would like the chat agent to use, identifiers of the corresponding LoRAs can be stored to the visitor's browser application where they can be retrieved by the chat agent for use during a conversation. The chat agent can also be automatically customized based on signals associated with the visitor, such as the visitor's age, gender preference, or geographic location. For example, a business that operates the chat agent may specify a certain set of properties or ranges of values for properties that may be used by the chat agent, where specific properties or property values (and the corresponding LoRAs) are selected when the chat agent is accessed by a visitor based on the signals associated with the visitor.

The text customization system 120 can train at least a subset of the LoRAs in the repository 105. Some implementations of the text customization system 120 train LoRA models based on a training set of text, such as a set of chat conversations, where each item of text has been tagged as containing text with a certain property. For example, the text customization system 120 trains LoRA models using chat conversations between two human users, chat conversations between a chat agent and a human user, or chat conversations between two chat agents. Using the tagged training items, the text customization system 120 modifies weights of a low-rank model until the low-rank model causes an LLM to produce text exhibiting the corresponding property. Some of the LoRA models in the repository 105 can be trained using items of text that are labeled as either exhibiting or not exhibiting a particular text property. When one of these models is applied to an LLM, the LLM produces text that has the corresponding property. Other models can be trained using text items that are labeled as exhibiting a degree of a particular property, such that the trained models cause an LLM to produce text with the corresponding degree of the property. The text customization system 120 can train multiple LoRAs for multiple different degrees of the same property. Applying a model that is trained for a higher degree of a property to an LLM, such as a higher degree of friendliness, causes the LLM to produce text that is more friendly than a model that is trained for a lower degree of the same property.

Instead of or in addition to the text customization system 120 training LoRA models in the repository 105, some implementations of the LoRA repository 105 include models that were trained by external systems.

The text customization system 120 enables a user to select the custom text properties to be generated by the LLM based on at least one user input 110. To facilitate these selections, the text customization system presents a set of manipulable user-interface controls. A user can manipulate the user-interface controls to select desired text properties. As the user manipulates the controls, the text customization system 120 generates a prompt 125 to the LLM 130, which outputs generated text 135 in response to the prompt. The text customization system 120 can display the generated text 135 to the user to provide a preview of text with the properties selected by the user. Based on the preview, the user can determine whether the LLM-generated text is satisfactory or can continue to manipulate the user-interface controls to select different properties if not.

Figure 2:
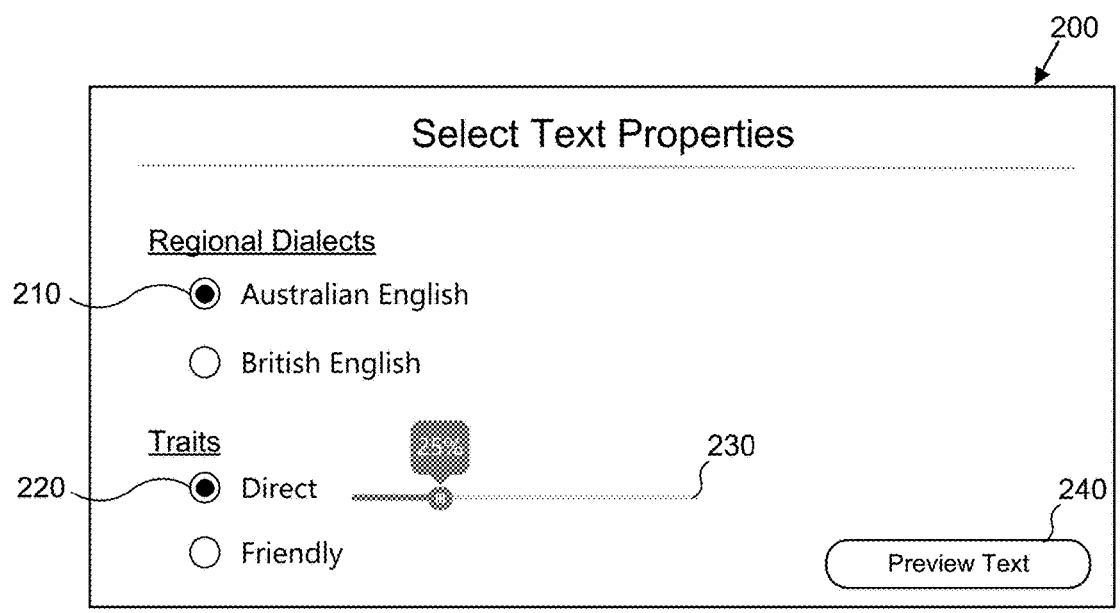
FIG. 2 illustrates an example user interface from which a user can select text properties.

The manipulable user-interface controls presented by the text customization system 120 can include controls to select or deselect particular properties (e.g., via checkboxes, radio dials, toggles, or drop-down lists) or to select a degree of a property (e.g., via slider bars, dials, or number entry boxes). FIG. 2 illustrates an example user interface 200 from which a user can select text properties. User-interface controls presented on the interface 200 can include controls, such as radio dials 210 and 220, for selecting or deselecting respective text properties. For example, a user can select a regional dialect for text to be generated by the LLM by manipulating one of the radio dials 210. Additionally, as described above, LoRAs can be trained based on text that expresses different degrees of a property. Accordingly, as further shown in FIG. 2, the user-interface controls can include controls, such as sliders 230, for specifying a degree of a corresponding property. Slider 230, for example, represents a range of degrees of the trait "directness," and a user can increase or decrease a degree of the trait by manipulating the slider 230 (e.g., sliding a thumb of the slider 230 left or right). The slider 230 can enable a user to select continuous or discrete degree values for a property. If, for example, the text customization system 120 has access to LoRA models that are trained to produce four degrees of the property "directness" (e.g., 25%, 50%, 75%, and 100%), the slider 230 can snap to each of these four percentages such that a user can select only one of the four percentage values. Alternatively, the text customization system 120 can enable a user to select any degree value between 0% and 100% but causes one of the LoRA models that is trained for a value closest to the user-selected value to be used to modify the LLM.

In some implementations, the text customization system 120 presents a first set of user-interface controls that are manipulable to select respective properties of text within a first category of properties. After a user has manipulated one or more controls from the first set to select one or more corresponding properties, the text customization system 120 presents a second set of user-interface controls that are manipulable to select respective properties within a second category of text properties. For example, referring to the example user interface in FIG. 2, the text customization system 120 can first present user-interface controls to select a regional dialect, as a first category of properties. After the user has selected a desired dialect, the system 120 presents user-interface controls to select properties from among a second category, a trait of the text.

Once a user has made the desired selections of text properties, the user can select the "preview text" button 240 to review the effect of the selected properties on LLM-generated text. The text customization system 120 determines the LoRA models corresponding to any user-selected properties and generates a prompt to the LLM that identifies the corresponding LoRA models. The prompt can instruct the LLM to generate any type of text for the preview. The user may, for example, ask the LLM to generate a paragraph of text about a desired topic. The text customization system 120 can instead maintain a set of dummy prompts that cause the LLM to generate various items of text. Alternatively, the text customization system 120 generates a mock chat agent interface, where the user can chat with the chat agent and review the types of responses generated by the chat agent when the chat agent is configured according to the user-selected text properties. Each chat input received from the user can be used to generate a corresponding prompt to the LLM.

Other implementations of the user interface 200 do not provide the "preview text" button 240. For example, the text customization system 120 can automatically generate prompts to the LLM and output text for preview by the user after the user manipulates the user-interface controls.

In some implementations, the text customization system 120 identifies sets of LORA models that are composable with one another. A composable set of LORAs can include two or more LoRA models for which the composed set of LoRAs causes an LLM to generate text that satisfies a performance criterion. The performance criterion, for example, can evaluate whether the LLM-generated text has each of the properties that would be generated if the LoRAs in the set were applied individually to the LLM. Alternatively, the performance criterion can evaluate whether LLM-generated text has properties that are within a threshold degree of each of the properties that would be generated if each LoRA in the set were individually applied. Furthermore, some implementations of the text customization system 120 identifies an order in which the LoRAs in a composable set should be applied to the LLM to cause the LLM to generate text with the intended properties.

Some of the user-interface controls that are displayed can be identified based on a state of other user-interface controls as manipulated. In particular, the text customization system 120 can modify the presented set of user-interface controls based on the composability of LoRAs associated with user-selected controls. FIGS. 3A-6C illustrate example user interfaces in which the presented controls are modified based on user selections.

Figures 3A, 3B:
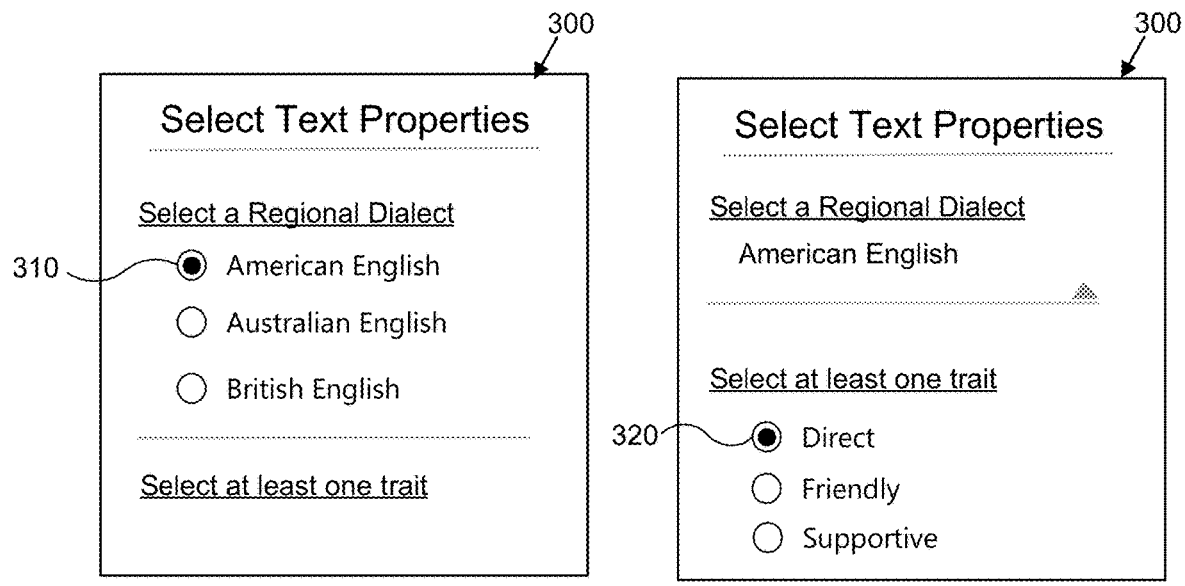
FIGS. 3A-3D illustrate an example user interface in which a user selection of a first text property causes display of a second set of text properties.
Figures 3C, 3D:
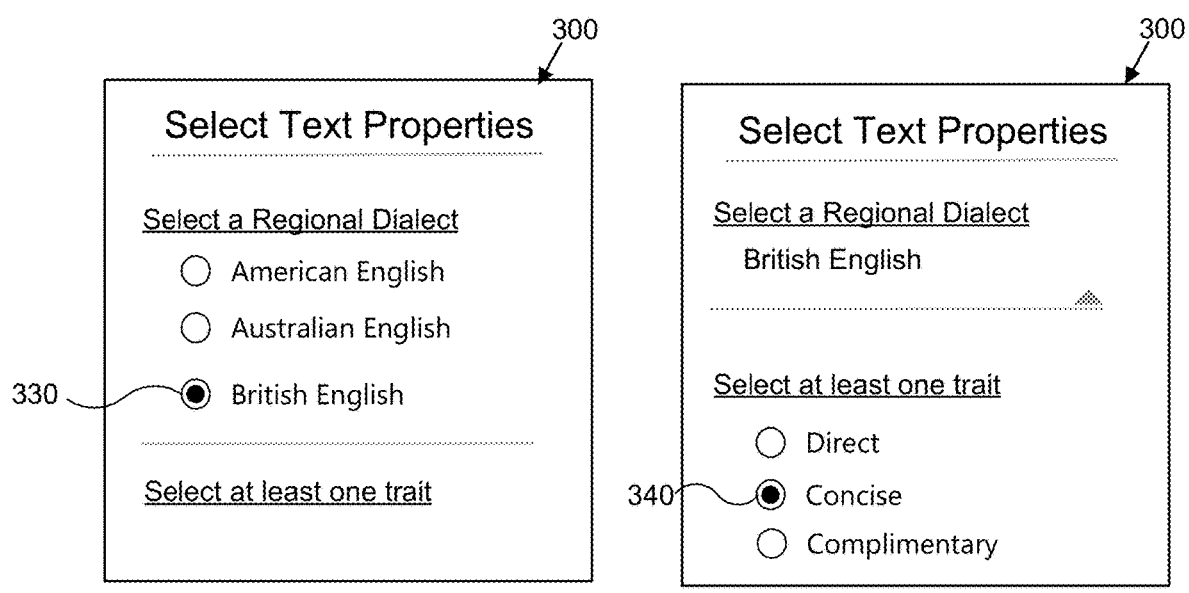

Referring to FIGS. 3A-3D, illustrated is an example user interface 300 in which a user selection of a first property causes the text customization system 120 to determine and present a second set of properties for which the corresponding LoRA models are composable with the LoRA model of the selected first property. In some implementations, a first LoRA model can be identified based on a current state of the controls as manipulated. Based on the first LoRA model, the text customization system 120 identifies a subset of LoRA models that are composable with the first model (e.g., models that can be composed with the first LoRA model while satisfying a performance criterion). A second set of controls can be provided that enable a user to select between properties corresponding to this subset of LORA models. For example, in FIG. 3A, text customization system 120 provides user-interface controls by which a user can select a regional dialect for the text to be generated by the LLM. After the user has selected a dialect (e.g., by manipulating the radio dial 310), the text customization system 120 provides options for traits that include directness, friendliness, and supportiveness, as shown in FIG. 3B, which can be traits that the text customization system 120 has determined correspond to LoRAs that can be composed with the LoRA for the selected regional dialect. The user can select one or more of the provided traits (e.g., by manipulating the radio dial 320). If the user instead chooses a different dialect (e.g., by manipulating the radio dial 330 shown in FIG. 3C), a different set of traits are presented to the user (as shown in FIG. 3D) based on the LoRA models for the different traits being composable with the LoRA for the selected dialect. The user can then select one or more of the traits provided for the selected dialect, for example by manipulating the radio dial 340.

The text customization system 120 can present different sets of properties to a user depending on other properties selected by the user, as illustrated in FIGS. 3A-3D. Alternatively, the text customization system 120 can display the same set of properties regardless of the state of the user-interface controls as manipulated, but can prevent user selection of some properties. For example, if the LoRA that causes an LLM to output text with an American English dialect is not composable with the LoRA that causes the LLM to generate "complimentary" text, the text customization system 120 deactivates a user-interface control associated with the trait "complimentary" to prevent user selection of the trait.

Figure 4A:
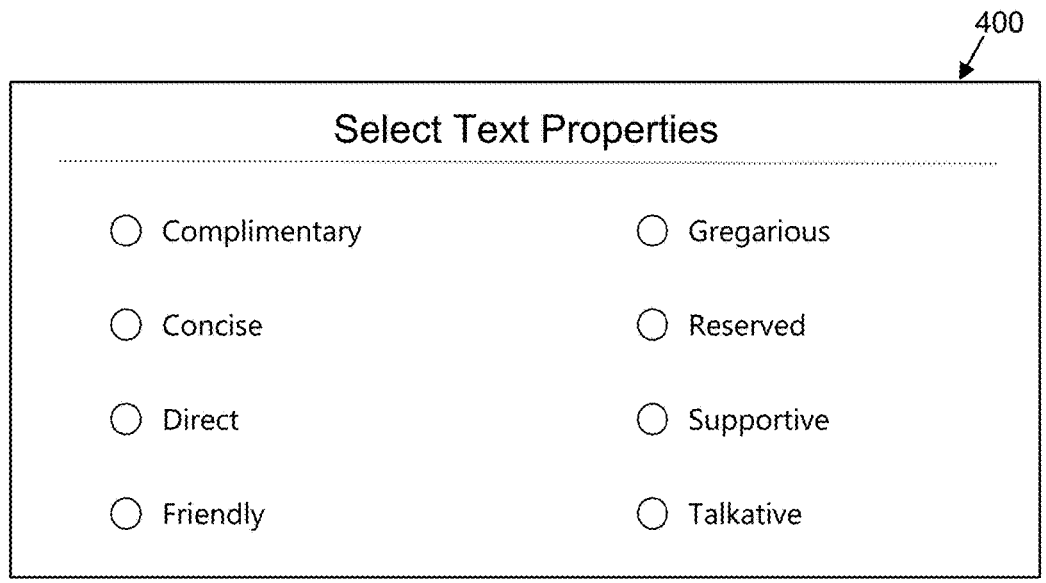
FIGS. 4A-4B illustrate an example user interface with user-interface controls to select various text properties.
Figure 4B:
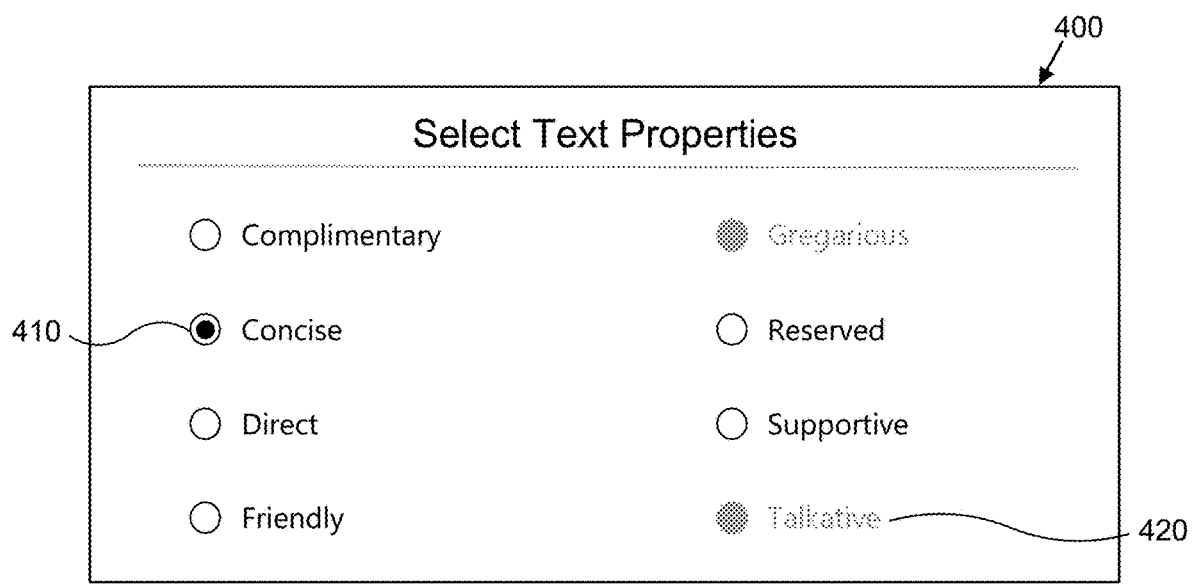

Furthermore, the text customization system 120 can sequentially present sets of properties for selection by a user, such as sets of properties associated with different categories, as illustrated in FIGS. 3A-3D. For example, the user interfaces 300 first present options to select a dialect (a first category of text properties). Once the dialect has been selected, the text customization system 120 identifies a set of traits (a second category of text properties) for which the corresponding LoRAs can be composed with the LoRA for the selected dialect. The identified properties are then output for display to and selection by the user. However, the text customization system 120 can alternatively modify the user-interface controls that are presented as a user manipulates the controls. FIG. 4A illustrates an example user interface 400 that provides user-interface controls to select various text properties. When a user selects a first property (e.g., by manipulating a radio dial 410 as shown in FIG. 4B), the text customization system 120 modifies the display of one or more other properties such that the user-interface controls associated with the other properties are not manipulable. For example, FIG. 4B illustrates that the control 420 for the property "talkative" has been deactivated based on the user's selection of the property "concise" (e.g., because the LoRA trained to produce "talkative" text is not composable with the LoRA trained to produce "concise" text).

The text customization system 120 can also present user interfaces on which the system modifies the degree of a text property that is selectable by a user in response to other selections by the user. As described above, the text customization system 120 can enable users to select a degree of a property, such as a degree of "directness" of LLM-generated text. Like other LoRA models described herein, the LoRA that is trained to achieve the selected degree may be composable with only a subset of the other models in the LoRA repository 105.

Figure 5A:
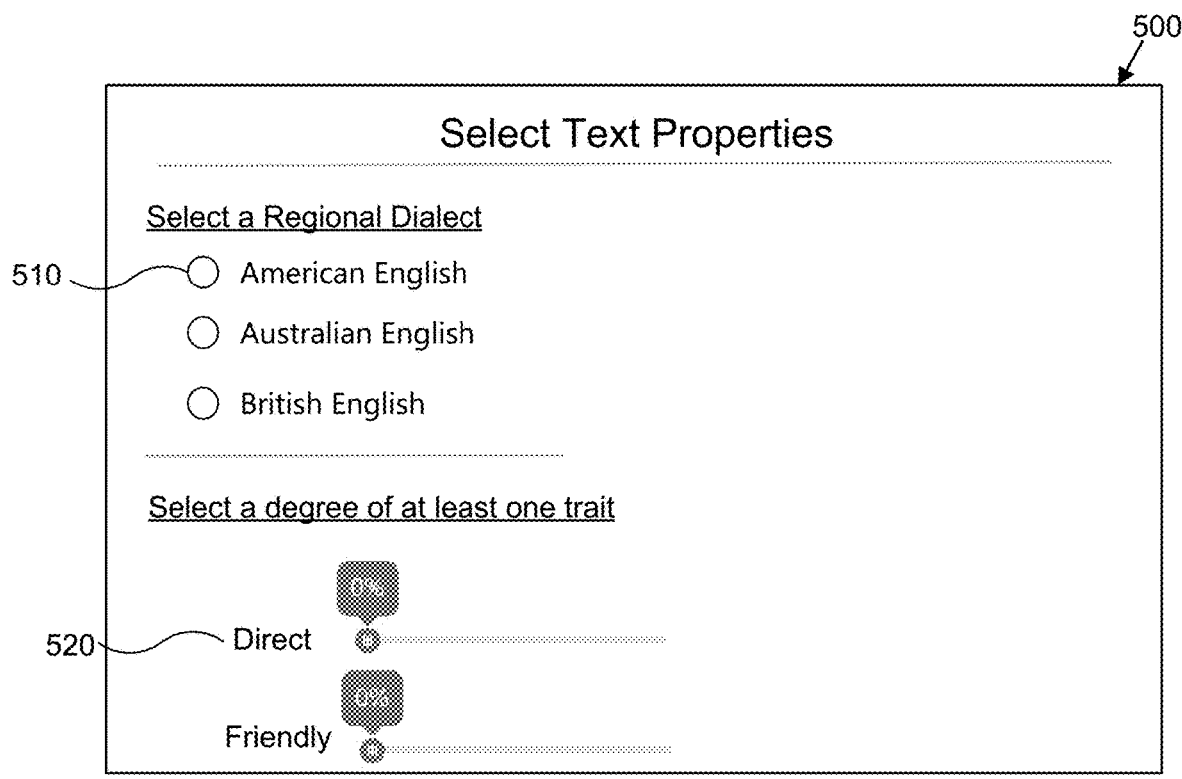
FIGS. 5A-5B illustrate an example user interface on which a selectable range of degrees of a text property are modified based on other selections made by a user.
Figure 5B:
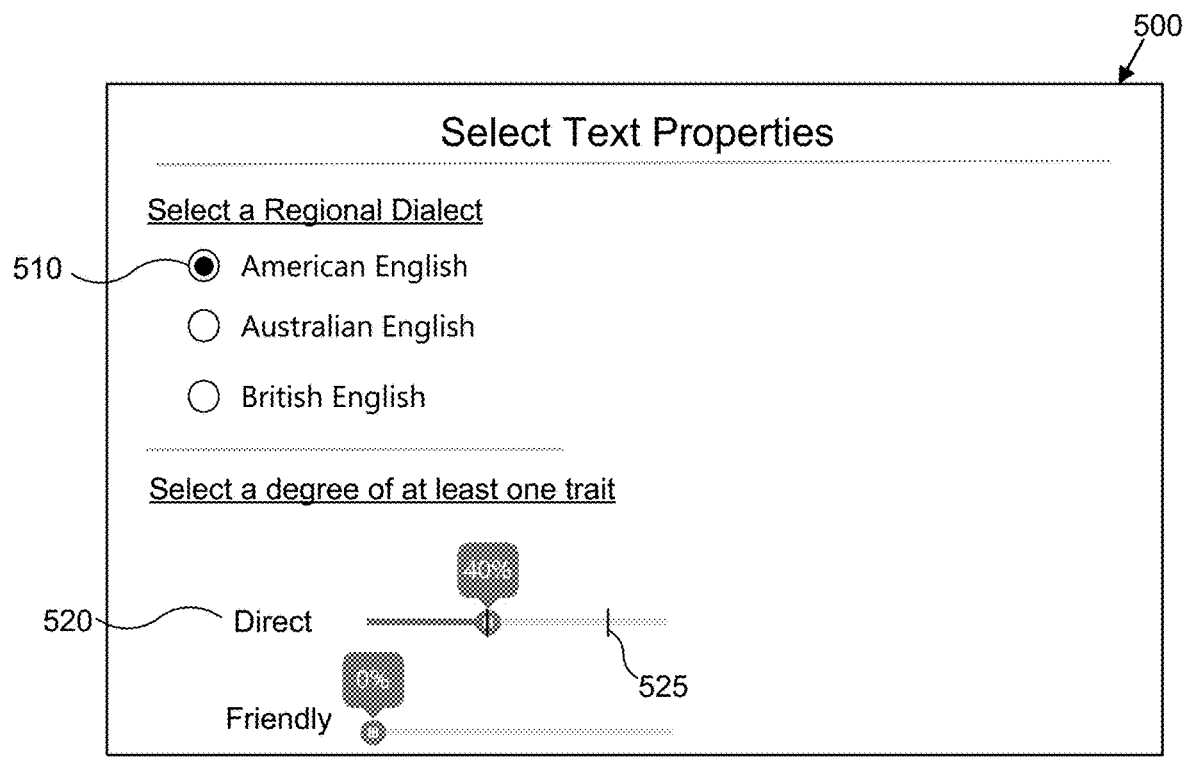

In some implementations, the text customization system 120 identifies a first LoRA model, corresponding to a first property, based on a current state of the user-interface controls as manipulated. A range of degrees of a second text property are identified based on the LoRA models trained to produce the identified range being composable with the first LoRA model. The text customization system 120 then presents user-interface controls from which the identified range is selectable. Degrees of the property outside the identified range are not selectable via the user-interface controls. FIGS. 5A-5B illustrate an example user interface 500 on which the selectable range of degrees of a property are modified based on other selections made by a user. In FIG. 5A, for example, the user can interact with controls 510 to select a regional dialect. Based on the dialect that is selected, there may be a limited range of degrees of some traits that are suitable to combine with the selected dialect. FIG. 5B illustrates an example in which the trait "directness" has a limited range (e.g., 40%-80%) for which corresponding LoRAs can be composed with the LoRA to produce text with an American English dialect. Accordingly, after the user manipulates the control 510 to select the American English dialect, the text customization system 120 modifies a slider 520 for the directness trait such that the user can only select values between 40% and 80%. For example, the text customization system 120 causes the slider 520 to be displayed with indicators 525 to identify the selectable range. If a user attempts to manipulate the slider 520 to select a value outside this range, the slider can be configured to snap the thumb to a value within the range, take no action in response to the user's input, or otherwise notify the user that the user attempted to select a non-selectable value.

Figure 6A:
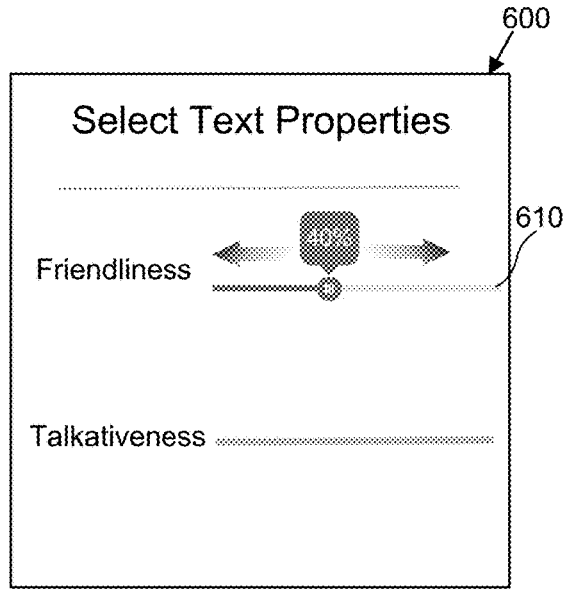
FIGS. 6A-6C illustrate an example user interface on which a user selection of a degree of a first text property causes display of a range of degrees of a second set of text properties.
Figure 6B:
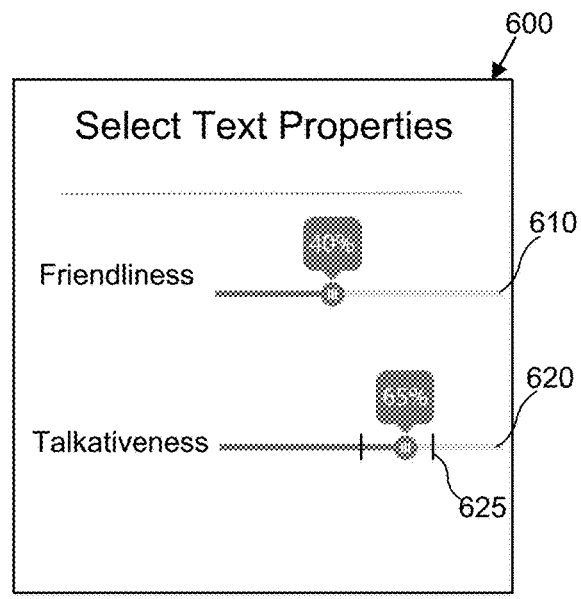
Figure 6C:
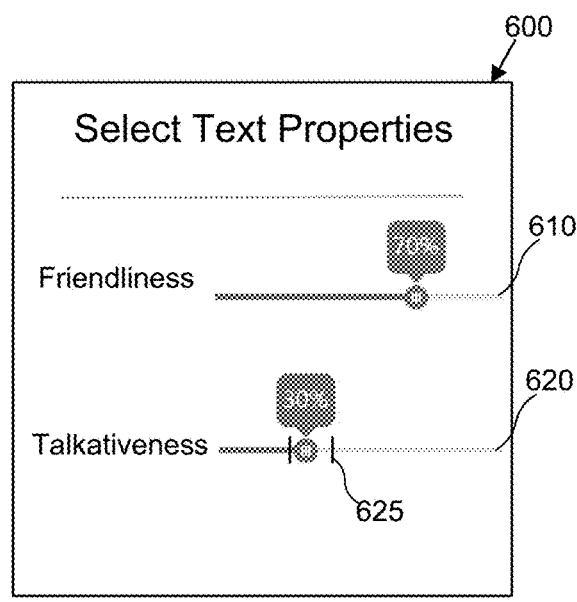

In another example, the text customization system 120 identifies a first LoRA model that corresponds to a first degree of a first property based on a current state of the user-interface controls as manipulated. Like in the example illustrated with respect to FIGS. 5A-5B, the text customization system 120 then identifies a range of degrees of a second property for which corresponding LoRAs are composable with the first LoRA, and modifies the user-interface control for the second property to only enable user selection of the identified range of degrees. FIGS. 6A-6C illustrate an example user interface 600 on which a user selection of a degree of a first property causes the text customization system 120 to determine and present a range of degrees of a second set of properties for which the corresponding LoRA models are composable with the LoRA model of the selected degree of the first property. For example, as shown in FIG. 6A, a user can interact with a slider 610 to select a degree of the trait "friendliness." Once the user has selected a value, such as 40%, the text customization system 120 modifies a slider 620 for the trait "talkativeness," as illustrated in FIG. 6B, such that only a limited range of the trait (e.g., 50%-75%) is selectable. For example, the slider 620 includes indicators 625 to identify the selectable range to the user. If the user manipulates the slider 610 to select a different value for the friendliness trait (e.g., 70%, as illustrated in FIG. 6C), the text customization system 120 can modify the slider 620 to identify a different range of selectable degrees of talkativeness (e.g., 25%-40. In some implementations, if a user attempts to select a degree of talkativeness that is outside the range illustrated in FIG. 6C, the text customization system 120 can modify a degree of friendliness indicated by the slider 610 to a degree that is composable with the degree of talkativeness selected by the user.

Customizing LLM-Generated Text Using LoRA Models

Figure 7:
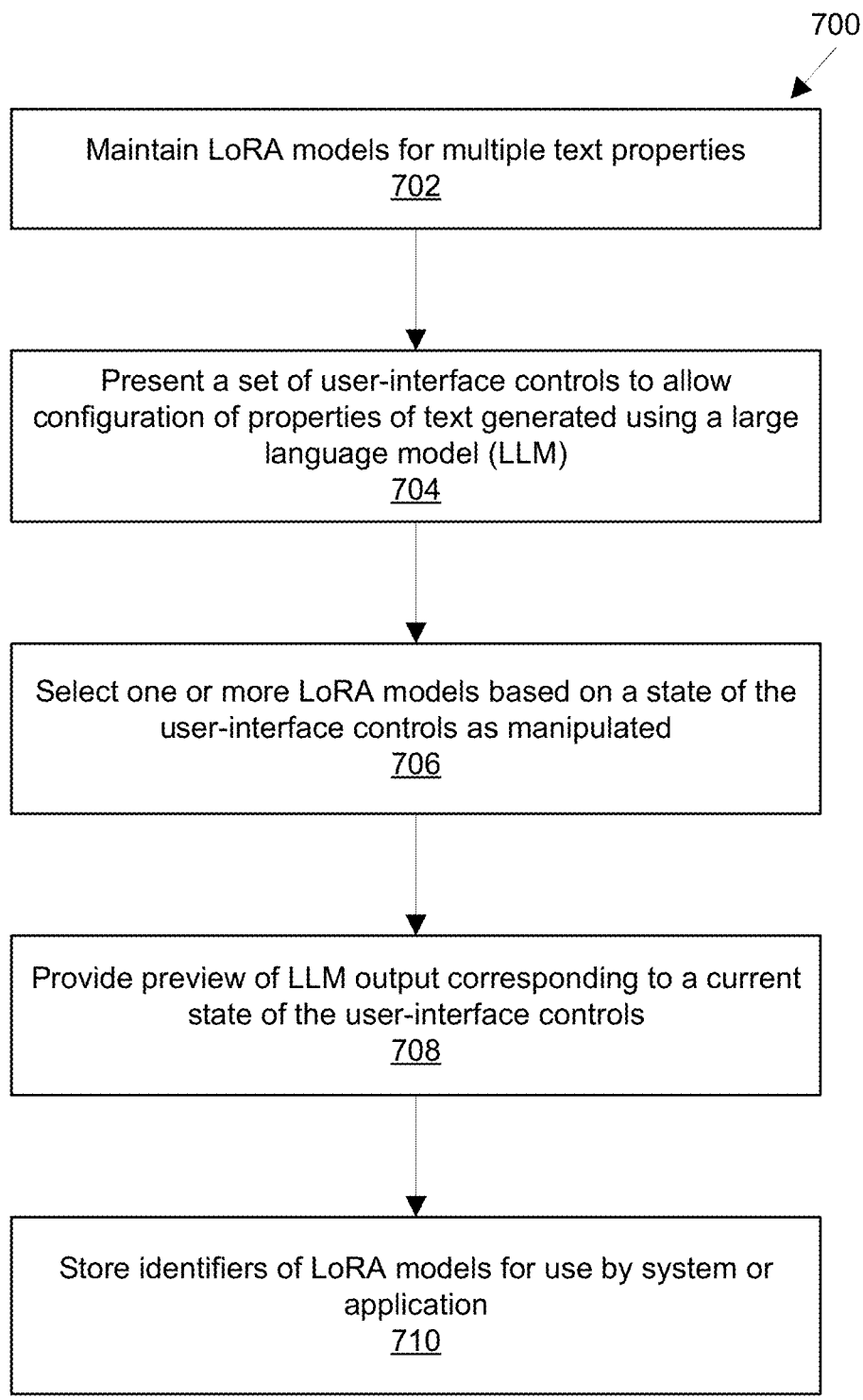
FIG. 7 is a flowchart illustrating a process for customizing LLM text properties, according to some implementations.

FIG. 7 is a flowchart illustrating a process 700 for customizing LLM text properties, according to some implementations. The process 700 can be performed by a computer system, such as the text customization system 120. Other implementations of the process 700 include additional, fewer, or different steps, or can perform the steps in different orders.

At step 702, the computer system maintains a plurality of LORA models. Each LoRA model includes a set of weights configured to modify parameters of an LLM to cause the LLM to generate text having a corresponding property. At least some of the LoRA models maintained by the computer system can be trained by the computer system to generate text with particular properties.

At step 704, the computer system presents a set of manipulable user-interface controls to allow configuration of properties of the text generated by the LLM. For example, the computer system presents controls that are similar to the controls described above with respect to FIGS. 2-6C.

At step 706, one or more LoRA models are selected by the computer system based on a state of the user-interface controls as manipulated, where the output of the LLM can be modified based on the selected LoRA models. As a user interacts with the user-interface controls, the computer system can iteratively update the controls that are displayed or the properties of the controls such that the controls only enable selection of LORA models that are mutually composable.

At step 708, the computer system provides a preview of LLM output corresponding to the current state of the user-interface controls during presentation and manipulation of the controls. To provide the preview, the computer system iteratively provides a prompt to the LLM and outputs the output of the LLM responsive to the prompt for each iteration. Each prompt can identify any LoRA models associated with the properties selected by the user based on the manipulation of the controls. In some implementations, when multiple LoRA models are being used to modify multiple properties of the LLM-generated text, the prompt also specifies an order in which the LoRAs are to be composed when they are applied to the LLM. At each iteration of providing the prompt to the LLM, the output of the LLM is modified based on the one or more LoRA models that are selected based on the state of the user-interface controls as manipulated.

After the user has selected desired properties for the LLM-generated text, the computer system, at step 710, stores identifiers of the LoRA models for later use by a relevant system or application. For example, the process 700 can be used when a user is customizing a chat agent on a website maintained by the user, such that the chat agent produces text that has certain properties desired by the user as the chat agent interacts with visitors to the user's website. The LoRA models for the properties selected by the user can be stored in a repository or instruction set that is accessible to the chat agent during execution of the chat agent. In another example, the process 700 can be used when a user is customizing how a chat agent will interact with the user. In this case, the LoRA models for the properties selected by the user can be stored in a browser application used by the user such that the LoRA models can be used to customize text produced by a chat agent executing in the browser application.

Neural Networks and Machine Learning

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publicly-available text corpuses may be, e.g., fine-tuned by further training using the complete works of Shakespeare as training data samples (e.g., where the intended use of the ML model is generating a scene of a play or other textual content in the style of Shakespeare).

Figure 8A:
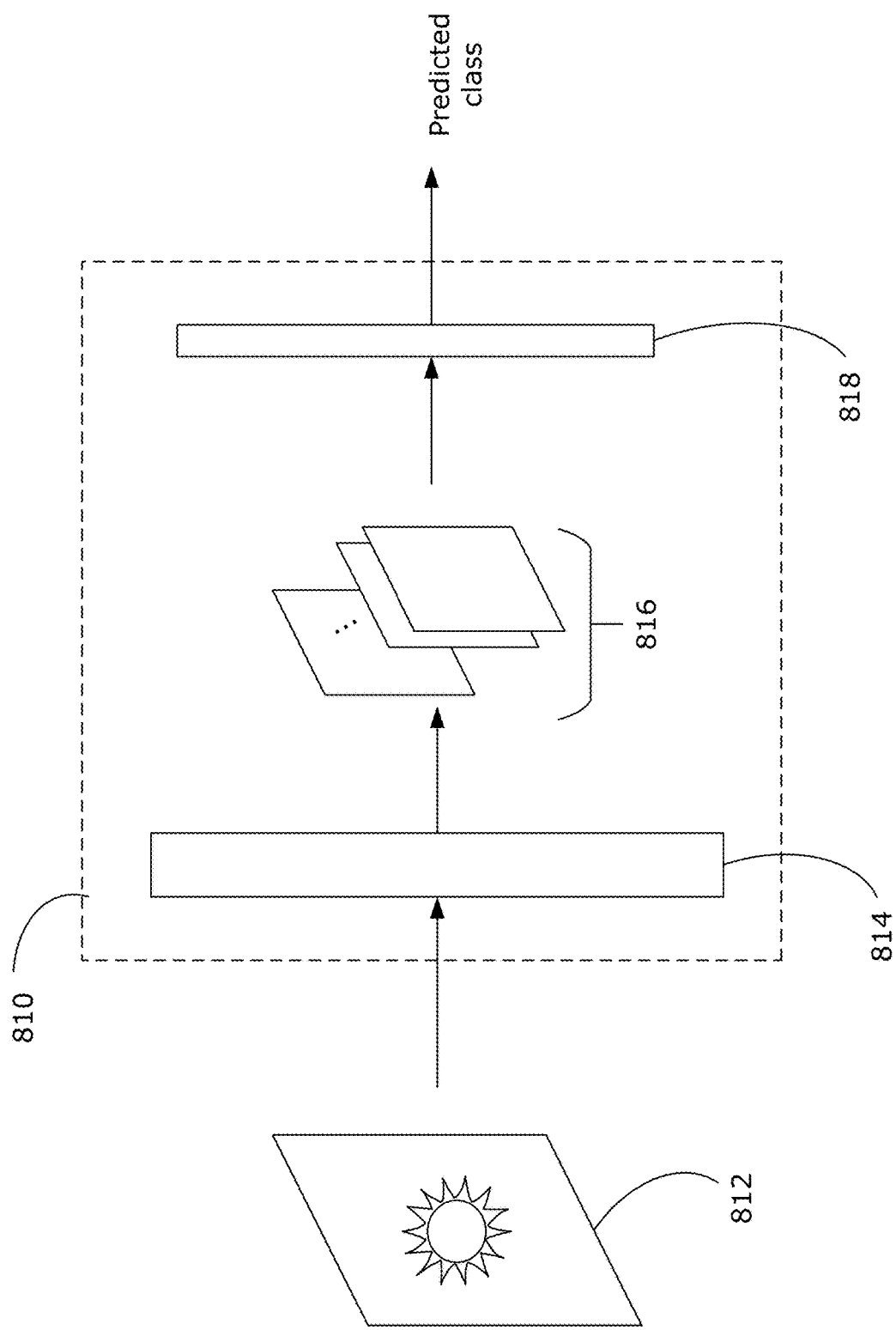
FIG. 8A is a block diagram of a simplified convolutional neural network, which may be used in examples of the present disclosure.

FIG. 8A is a simplified diagram of an example CNN 810, which is an example of a DNN that is commonly used for image processing tasks such as image classification, image analysis, object segmentation, etc. An input to the CNN 810 may be a 2D RGB image 812.

The CNN 810 includes a plurality of layers that process the image 812 in order to generate an output, such as a predicted classification or predicted label for the image 812. For simplicity, only a few layers of the CNN 810 are illustrated including at least one convolutional layer 814. The convolutional layer 814 performs convolution processing, which may involve computing a dot product between the input to the convolutional layer 814 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 814 is a set of feature maps 816 (sometimes referred to as activation maps). Each feature map 816 generally has smaller width and height than the image 812. The set of feature maps 516 encode image features that may be processed by subsequent layers of the CNN 510, depending on the design and intended task for the CNN 510. In this example, a fully connected layer 518 processes the set of feature maps 516 in order to perform a classification of the image, based on the features encoded in the set of feature maps 516. The fully connected layer 518 contains learned parameters that, when applied to the set of feature maps 516, outputs a set of probabilities representing the likelihood that the image 512 belongs to each of a defined set of possible classes. The class having the highest probability may then be outputted as the predicted classification for the image 512.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

FIG. 5B is a simplified diagram of an example transformer 550, and a simplified discussion of its operation is now provided. The transformer 550 includes an encoder 852 (which may comprise one or more encoder layers/blocks connected in series) and a decoder 554 (which may comprise one or more decoder layers/blocks connected in series). Generally, the encoder 852 and the decoder 854 each include a plurality of neural network layers, at least one of which may be a self-attention layer. The parameters of the neural network layers may be referred to as the parameters of the language model.

The transformer 850 may be trained on a text corpus that is labelled (e.g., annotated to indicate verbs, nouns, etc.) or unlabeled. LLMs may be trained on a large unlabeled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 850 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look]

and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

Figure 8B:
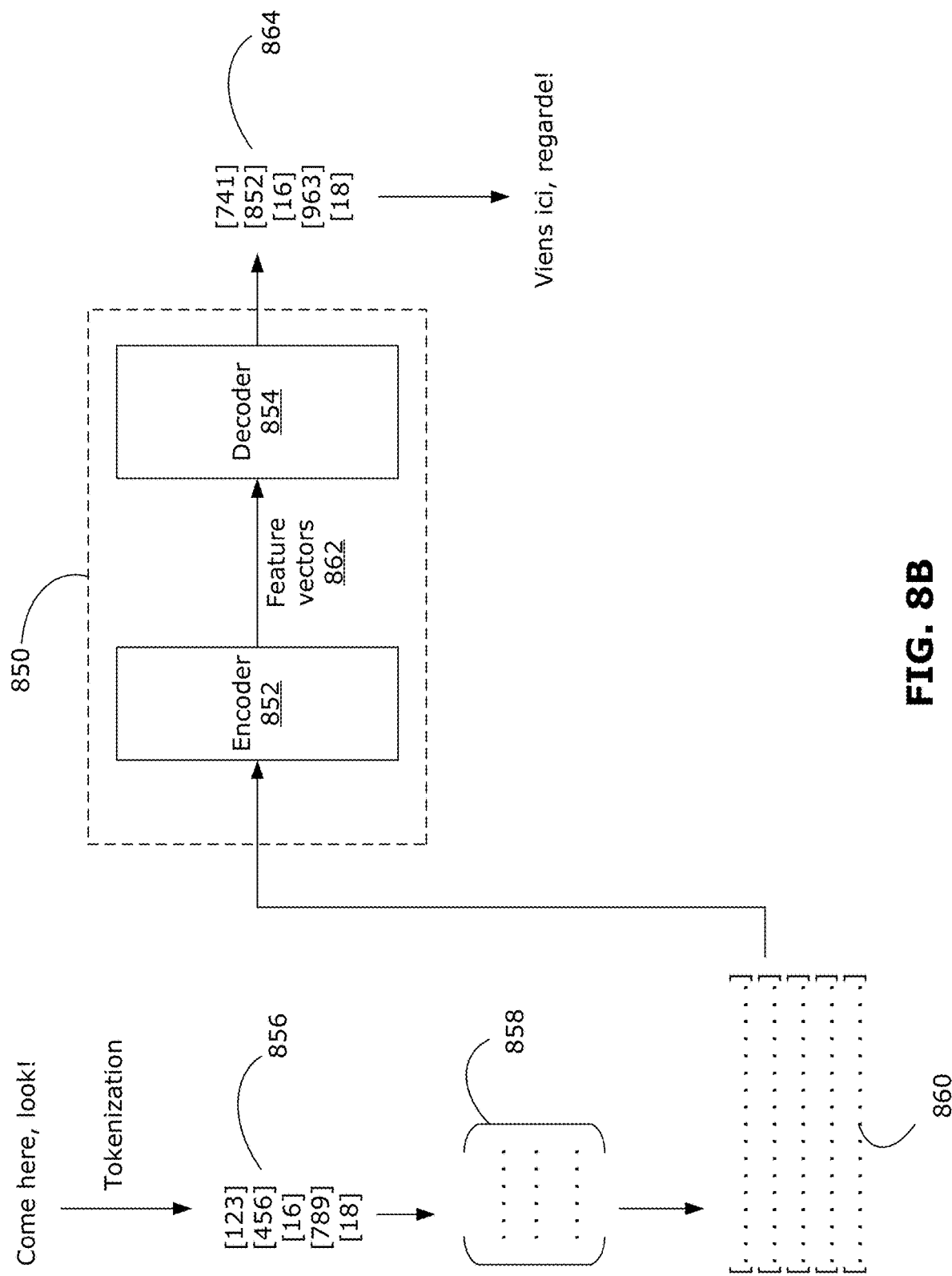
FIG. 8B is a block diagram of a simplified transformer neural network, which may be used in examples of the present disclosure.

In FIG. 8B, a short sequence of tokens 856 corresponding to the text sequence "Come here, look!" is illustrated as input to the transformer 850. Tokenization of the text sequence into the tokens 856 may be performed by some pre-processing tokenization module such as, for example, a byte pair encoding tokenizer (the "pre" referring to the tokenization occurring prior to the processing of the tokenized input by the LLM), which is not shown in FIG. 8B for simplicity. In general, the token sequence that is inputted to the transformer 850 may be of any length up to a maximum length defined based on the dimensions of the transformer 850 (e.g., such a limit may be 2048 tokens in some LLMs). Each token 856 in the token sequence is converted into an embedding vector 860 (also referred to simply as an embedding). An embedding 860 is a learned numerical representation (such as, for example, a vector) of a token that captures some semantic meaning of the text segment represented by the token 856. The embedding 860 represents the text segment corresponding to the token 856 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 860 corresponding to the "look" token will be closer to another embedding corresponding to the "see" token in the vector space, as compared to the distance between the embedding 860 corresponding to the "look" token and another embedding corresponding to the "cake" token. The vector space may be defined by the dimensions and values of the embedding vectors. Various techniques may be used to convert a token 856 to an embedding 860. For example, another trained ML model may be used to convert the token 856 into an embedding 860. In particular, another trained ML model may be used to convert the token 856 into an embedding 860 in a way that encodes additional information into the embedding 860 (e.g., a trained ML model may encode positional information about the position of the token 856 in the text sequence into the embedding 860). In some examples, the numerical value of the token 856 may be used to look up the corresponding embedding in an embedding matrix 858 (which may be learned during training of the transformer 850).

The generated embeddings 860 are input into the encoder 852. The encoder 852 serves to encode the embeddings 860 into feature vectors 862 that represent the latent features of the embeddings 860. The encoder 852 may encode positional information (i.e., information about the sequence of the input) in the feature vectors 862. The feature vectors 862 may have very high dimensionality (e.g., on the order of thousands or tens of thousands), with each element in a feature vector 862 corresponding to a respective feature. The numerical weight of each element in a feature vector 862 represents the importance of the corresponding feature. The space of all possible feature vectors 862 that can be generated by the encoder 852 may be referred to as the latent space or feature space.

Conceptually, the decoder 854 is designed to map the features represented by the feature vectors 862 into meaningful output, which may depend on the task that was assigned to the transformer 850. For example, if the transformer 850 is used for a translation task, the decoder 854 may map the feature vectors 862 into text output in a target language different from the language of the original tokens 856. Generally, in a generative language model, the decoder 854 serves to decode the feature vectors 862 into a sequence of tokens. The decoder 854 may generate output tokens 864 one by one. Each output token 864 may be fed back as input to the decoder 854 in order to generate the next output token 864. By feeding back the generated output and applying self-attention, the decoder 854 is able to generate a sequence of output tokens 864 that has sequential meaning (e.g., the resulting output text sequence is understandable as a sentence and obeys grammatical rules). The decoder 854 may generate output tokens 864 until a special [EOT] token (indicating the end of the text) is generated. The resulting sequence of output tokens 864 may then be converted to a text sequence in post-processing. For example, each output token 864 may be an integer number that corresponds to a vocabulary index. By looking up the text segment using the vocabulary index, the text segment corresponding to each output token 864 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 9:
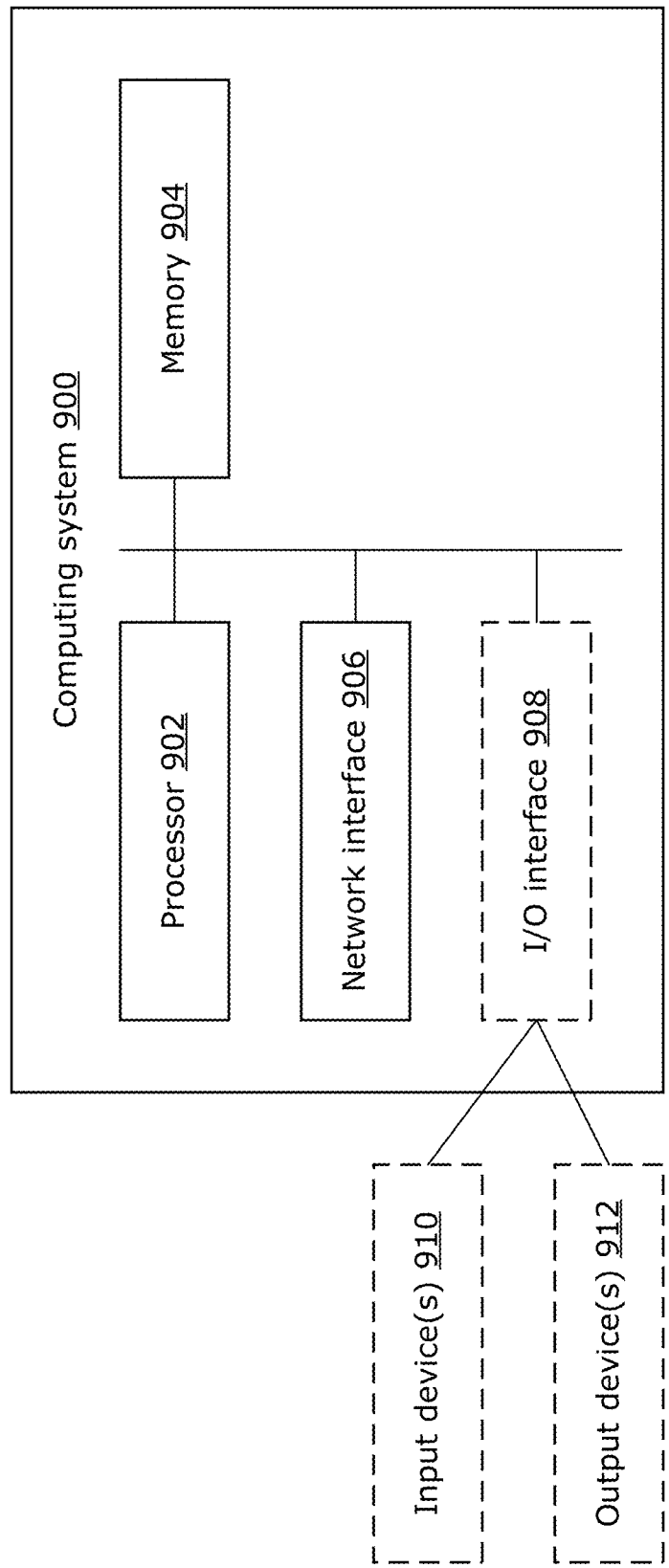
FIG. 9 is a block diagram of an example computing system, which may be used to implement examples of the present disclosure.

FIG. 9 illustrates an example computing system 900, which may be used to implement examples of the present disclosure, such as a prompt generation engine to generate prompts to be provided as input to a language model such as a LLM. Additionally or alternatively, one or more instances of the example computing system 900 may be employed to execute the LLM. For example, a plurality of instances of the example computing system 900 may cooperate to provide output using an LLM in manners as discussed above.

The example computing system 900 includes at least one processing unit, such as a processor 902, and at least one physical memory 904. The processor 902 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 904 may include a volatile or non-volatile memory (e.g., a flash memory, a random access memory (RAM), and/or a read-only memory (ROM)). The memory 904 may store instructions for execution by the processor 902, to the computing system 900 to carry out examples of the methods, functionalities, systems and modules disclosed herein.

The computing system 900 may also include at least one network interface 906 for wired and/or wireless communications with an external system and/or network (e.g., an intranet, the Internet, a P2P network, a WAN and/or a LAN). A network interface may enable the computing system 900 to carry out communications (e.g., wireless communications) with systems external to the computing system 900, such as a language model residing on a remote system.

The computing system 900 may optionally include at least one input/output (I/O) interface 908, which may interface with optional input device(s) 910 and/or optional output device(s) 912. Input device(s) 910 may include, for example, buttons, a microphone, a touchscreen, a keyboard, etc. Output device(s) 912 may include, for example, a display, a speaker, etc. In this example, optional input device(s) 910 and optional output device(s) 912 are shown external to the computing system 900. In other examples, one or more of the input device(s) 910 and/or output device(s) 912 may be an internal component of the computing system 900.

A computing system, such as the computing system 900 of FIG. 9, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method comprising:
   maintaining a plurality of low-rank adaptation (LoRA) models that each include a set of weights configured to modify parameters of a large-language model (LLM) to cause the LLM to generate text having a corresponding property;
   presenting a set of manipulable user-interface controls to allow configuration of properties of text generated using the LLM and wherein output of the LLM is to be modified based on one of more of the LoRA models of the plurality of LoRA models selected based on a state of the user-interface controls as manipulated; and
   providing a preview of LLM output corresponding to a current state of the user-interface controls during presentation and manipulation thereof, wherein providing the preview includes iteratively providing a prompt to the LLM and outputting the output of the LLM responsive to the prompt for each iteration, wherein, for each iteration, the output of the LLM is modified based on one or more of the LoRA models of the plurality of LORA models selected based on the current state of the user-interface controls as manipulated.

2. The computer-implemented method of claim 1, further comprising:
   identifying a first LoRA model of the plurality of LORA models based on the current state of the user-interface controls as manipulated, wherein the first LoRA model corresponds to a first property of text generated by the LLM; and
   identifying a range of degrees of a second property of text generated by the LLM based on a LoRA model corresponding to a degree in the identified range being composable with the first LoRA model;
   wherein presenting the set of manipulable user-interface controls comprises displaying indications of degrees of the second property in the identified range as selectable and displaying indications of degrees of the second property that are not in the identified range as not selectable.

3. The computer-implemented method of claim 1, wherein presenting the set of user-interface controls comprises:
   identifying a first LoRA model of the plurality of LORA models based on the current state of the user-interface controls as manipulated, wherein the first LoRA model corresponds to a first property of text generated by the LLM;
   identifying a subset of the plurality of LORA models based on the first LoRA model; and
   presenting user-interface controls associated with the properties corresponding to the identified subset of LORA models that are manipulable to select one or more of the corresponding properties.

4. The computer-implemented method of claim 1, wherein presenting the set of user-interface controls comprises:

presenting a first user-interface control that is manipulable to change a degree of a first property of the text generated by the LLM;
wherein manipulation of the set of user-interface controls a selection of the degree of the first property.

5. The computer-implemented method of claim 1, wherein presenting the set of user-interface controls comprises:
presenting a first set of user-interface controls that are manipulable to select respective properties of text within a first category of properties; and
in response to receiving manipulation of a user-interface control of the first set of user-interface controls to select a property from among the first category of properties, presenting a second set of user-interface controls that are manipulable to select respective properties of text within a second category of properties.

6. The computer-implemented method of claim 5, wherein the properties within the second category of properties are determined based on the selected property from among the first category of properties.

7. The computer-implemented method of claim 1, wherein the set of user-interface controls are presented to allow configuration of properties of text generated by the LLM for output by a chat agent.

8. The computer-implemented method of claim 7, further comprising:
storing identifiers of the plurality of LoRA models in a repository or instruction set that is accessible to the chat agent during execution of the chat agent.

9. The computer-implemented method of claim 1, wherein the set of user-interface controls are output for display by a browser application, and wherein the method further comprises:
storing identifiers of the plurality of LORA models in the browser application.

10. The computer-implemented method of claim 1:
wherein providing the prompt to the LLM comprises specifying an order in which the one or more LoRA models selected based on the current state of the user-interface controls as manipulated are to be composed.

11. The computer-implemented method of claim 1, further comprising:
training the plurality of LORA models based on a set of chat conversations that have been tagged as containing the property corresponding to each of the plurality of LORA models.

12. A non-transitory computer readable storage medium storing executable instructions, execution of which by a processor causing the processor to:
maintain a plurality of low-rank adaptation (LoRA) models that each include a set of weights configured to modify parameters of a large-language model (LLM) to cause the LLM to generate text having a corresponding property;
present a set of manipulable user-interface controls to allow configuration of properties of text generated using the LLM and wherein output of the LLM is to be modified based on one of more of the LoRA models of the plurality of LoRA models selected based on a state of the user-interface controls as manipulated; and
provide a preview of LLM output corresponding to a current state of the user-interface controls during presentation and manipulation thereof, wherein providing the preview includes iteratively providing a prompt to the LLM and outputting the output of the LLM responsive to the prompt for each iteration, wherein, for each iteration, the output of the LLM is modified based on one or more of the LoRA models of the plurality of LORA models selected based on the current state of the user-interface controls as manipulated.

13. The non-transitory computer readable storage medium of claim 12, wherein execution of the instructions further causes the processor to:
identify a first LoRA model of the plurality of LORA models based on the current state of the user-interface controls as manipulated, wherein the first LoRA model corresponds to a first property of text generated by the LLM; and
identify a range of degrees of a second property of text generated by the LLM based on a LoRA model corresponding to a degree in the identified range being composable with the first LoRA model;
wherein presenting the set of manipulable user-interface controls comprises displaying indications of degrees of the second property in the identified range as selectable and displaying indications of degrees of the second property that are not in the identified range as not selectable.

14. The non-transitory computer readable storage medium of claim 12, wherein presenting the set of user-interface controls comprises:
identifying a first LoRA model of the plurality of LoRA models based on the current state of the user-interface controls as manipulated, wherein the first LoRA model corresponds to a first property of text generated by the LLM;
identifying a subset of the plurality of LORA models based on the first LoRA model; and
presenting user-interface controls associated with the properties corresponding to the identified subset of LORA models that are manipulable to select one or more of the corresponding properties.

15. The non-transitory computer readable storage medium of claim 12, wherein presenting the set of user-interface controls comprises:
presenting a first user-interface control that is manipulable to change a degree of a first property of the text generated by the LLM;
wherein manipulation of the set of user-interface controls a selection of the degree of the first property.

16. The non-transitory computer readable storage medium of claim 12, wherein presenting the set of user-interface controls comprises:
presenting a first set of user-interface controls that are manipulable to select respective properties of text within a first category of properties; and
in response to receiving manipulation of a user-interface control of the first set of user-interface controls to select a property from among the first category of properties, presenting a second set of user-interface controls that are manipulable to select respective properties of text within a second category of properties.

17. The non-transitory computer readable storage medium of claim 12, wherein the set of user-interface controls are presented to allow configuration of properties of text generated by the LLM for output by a chat agent.

18. The non-transitory computer readable storage medium of claim 17, wherein execution of the instructions further causes the processor to:
storing identifiers of the plurality of LORA models in a repository or instruction set that is accessible to the chat agent during execution of the chat agent.

19. The non-transitory computer readable storage medium of claim 12:
wherein providing the prompt to the LLM comprises specifying an order in which the one or more LoRA models selected based on the current state of the user-interface controls as manipulated are to be composed.

20. A system comprising:
at least one hardware processor; and
at least one non-transitory memory storing instructions, which, when executed by the at least one hardware processor, cause the system to:
maintain a plurality of low-rank adaptation (LoRA) models that each include a set of weights configured to modify parameters of a large-language model (LLM) to cause the LLM to generate text having a corresponding property;
present a set of manipulable user-interface controls to allow configuration of properties of text generated using the LLM and wherein output of the LLM is to be modified based on one of more of the LoRA models of the plurality of LORA models selected based on a state of the user-interface controls as manipulated; and
provide a preview of LLM output corresponding to a current state of the user-interface controls during presentation and manipulation thereof, wherein providing the preview includes iteratively providing a prompt to the LLM and outputting the output of the LLM responsive to the prompt for each iteration, wherein, for each iteration, the output of the LLM is modified based on one or more of the LoRA models of the plurality of LoRA models selected based on the current state of the user-interface controls as manipulated.

* * * * *